US011681729B2

(12) United States Patent
Gerhardt et al.

(10) Patent No.: US 11,681,729 B2
(45) Date of Patent: *Jun. 20, 2023

(54) SECURE RESOLUTION OF CANONICAL ENTITIES

(71) Applicant: Palantir Technologies Inc., Denver, CO (US)

(72) Inventors: Matthew Gerhardt, Bethesda, MD (US); Christopher Brahms, San Diego, CA (US); Colin Hamilton, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/443,440

(22) Filed: Jul. 26, 2021

(65) Prior Publication Data
US 2021/0357437 A1 Nov. 18, 2021

Related U.S. Application Data

(63) Continuation of application No. 15/943,568, filed on Apr. 2, 2018, now Pat. No. 11,074,277.
(Continued)

(51) Int. Cl.
*G06F 16/28* (2019.01)
*G06F 21/60* (2013.01)
(Continued)

(52) U.S. Cl.
CPC ........ *G06F 16/288* (2019.01); *G06F 16/2358* (2019.01); *G06F 16/287* (2019.01);
(Continued)

(58) Field of Classification Search
CPC .... G06F 16/285; G06F 16/288; G06F 16/338; G06F 16/904; G06F 16/2358;
(Continued)

(56) References Cited

U.S. PATENT DOCUMENTS 9,864,770 B2 * 1/2018 Lee ................... G06F 16/176
11,074,277 B1 7/2021 Gerhardt et al.
(Continued)

*Primary Examiner* — Marcin R Filipczyk
(74) *Attorney, Agent, or Firm* — Knobbe, Martens, Olson & Bear, LLP

(57) ABSTRACT

Computer implemented systems and methods are disclosed for automatically and canonically identifying related data in various data structures while maintaining secure access to individual data objects and their properties. Data structures may include a plurality of records, wherein each record is associated with a respective entity. Access to individual records, or in some embodiments access to individual attributes of a record, may be restricted to particular users or groups on a per-item basis. In accordance with some embodiments, systems and methods are disclosed for identifying pairs of records, determining a probability that both records relate to a common entity, and securely notifying and presenting users with information regarding the probability while preserving the access restrictions for the individual records and attributes. Record pairs that potentially refer to the same entity may be linked, reconciled, or ignored in response to feedback from users who have access to one or both records.

20 Claims, 6 Drawing Sheets

Related U.S. Application Data

(60) Provisional application No. 62/492,579, filed on May 1, 2017.

(51) Int. Cl.
*G06F 21/62* (2013.01)
*G06F 16/23* (2019.01)
*G06F 16/904* (2019.01)
*G06F 16/332* (2019.01)
*G06F 16/338* (2019.01)

(52) U.S. Cl.
CPC ........ *G06F 16/338* (2019.01); *G06F 16/3329* (2019.01); *G06F 16/904* (2019.01); *G06F 21/604* (2013.01); *G06F 21/6209* (2013.01)

(58) Field of Classification Search
CPC .. G06F 16/3329; G06F 21/604; G06F 21/606; G06F 21/6209; G06F 16/248; G06F 16/287
See application file for complete search history.

(56) References Cited

U.S. PATENT DOCUMENTS

| | | | | |
|---|---|---|---|---|
| 2013/0226908 | A1* | 8/2013 | Risher | H04L 63/00 707/722 |
| 2017/0255701 | A1* | 9/2017 | Pratt | H04L 43/028 |
| 2017/0371926 | A1* | 12/2017 | Shiran | G06F 16/24524 |

* cited by examiner

SECURE RESOLUTION OF CANONICAL ENTITIES

CROSS-REFERENCE TO RELATED APPLICATIONS

This application is a continuation of U.S. application Ser. No. 15/943,568, filed Apr. 2, 2018, and titled "SECURE RESOLUTION OF CANONICAL ENTITIES," which claims benefit of U.S. Provisional Patent Application No. 62/492,579, filed May 1, 2017, and titled "SECURE RESOLUTION OF CANONICAL ENTITIES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, and visualization. More specifically, the present disclosure relates to systems and techniques for identifying and resolving canonical entity records.

BACKGROUND

Obtaining relevant information regarding a particular entity from multiple large lists of records can be relatively straightforward in some situations. One particular situation is when records in separate lists are similar and it is desired to obtain information in records having a particular value or character string in a particular field. The fields at issue can be isolated using filtering functions of data interfacing software and the desired information retrieved. By using combinations of filtering functions, more sophistication can be provided to the way in which fields are identified for comparison. Once compared, some records can be isolated based on the comparisons on the particular fields. The isolated records can then be aggregated so as to provide a report including all the records that together constitute the desired information.

But in order to recognize common records, such filtering functions rely on identical fields across the records. In the real world, lists may have no identical fields across the records, despite those records being related, or can have identical fields in a relatively small number of fields (or parts of fields) such that existing filtering functions are unable to provide isolation of the desired records from other records. For example, such problems can occur when a list has records originating from a number of different sources. This problem only worsens as the size of lists becomes larger (e.g., a list having billions of records), in terms of the number of records present.

Access to particular fields, records, or lists may further be restricted for security or privacy reasons, and these restrictions may increase the likelihood that information regarding a particular entity will be stored across multiple records. For example, an individual creating or updating a record regarding a particular entity may not have access to other records regarding the entity, and as a result may create or update a record that contains incomplete, duplicate, or conflicting information.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a secure entity resolution system that may automatically analyze a data structure or structures containing large numbers of records, identify records that relate to a common entity, and determine whether and how these records may be securely presented to users who have varying levels of access to the records (or varying levels of access to data fields within the records). Embodiments of the present disclosure also relate to user interfaces for displaying and reconciling records that relate to a common entity, facilitating communications and collaboration between users regarding records that may relate to a common entity, notifying users of potential matches, and maintaining access controls for records and/or fields that reference a common entity but have differing access criteria.

As described below, records in a data structure (e.g., a list) may include one or more fields. A field may include any data, information, or things, such as a person, a place, a date, a time, an identification number, and the like. In an example application, a human agent may be tasked with investigating individuals who are suspected to be engaged in an illegal activity or activities, and may generate or access records in a data structure that contain information regarding the individuals and/or the activities. However, the human agent may be unable to timely correlate thousands or millions of records to identify other records that contain information regarding the same individuals and/or activities without the computing technology and the embodiments of the present disclosure. Further, the implementation of the various embodiments of the present disclosure via computer technology enables many of the advantages described herein, including more efficient interaction with, and presentation of, various types of electronic data.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of geographic information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described below, existing technologies for resolving canonical entities are limited in various ways (e.g., they are slow and cumbersome, they require more resources than can practically be made available, they cannot securely reconcile records that have varying access restrictions, etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing and updating of associations between records and probabilities that records are associated with a common entity, and secure presentation of records that are likely to relate to a common entity. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic records.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate exemplary embodiments of the present disclosure. In the drawings.

DETAILED DESCRIPTION

Overview

Figure 1:
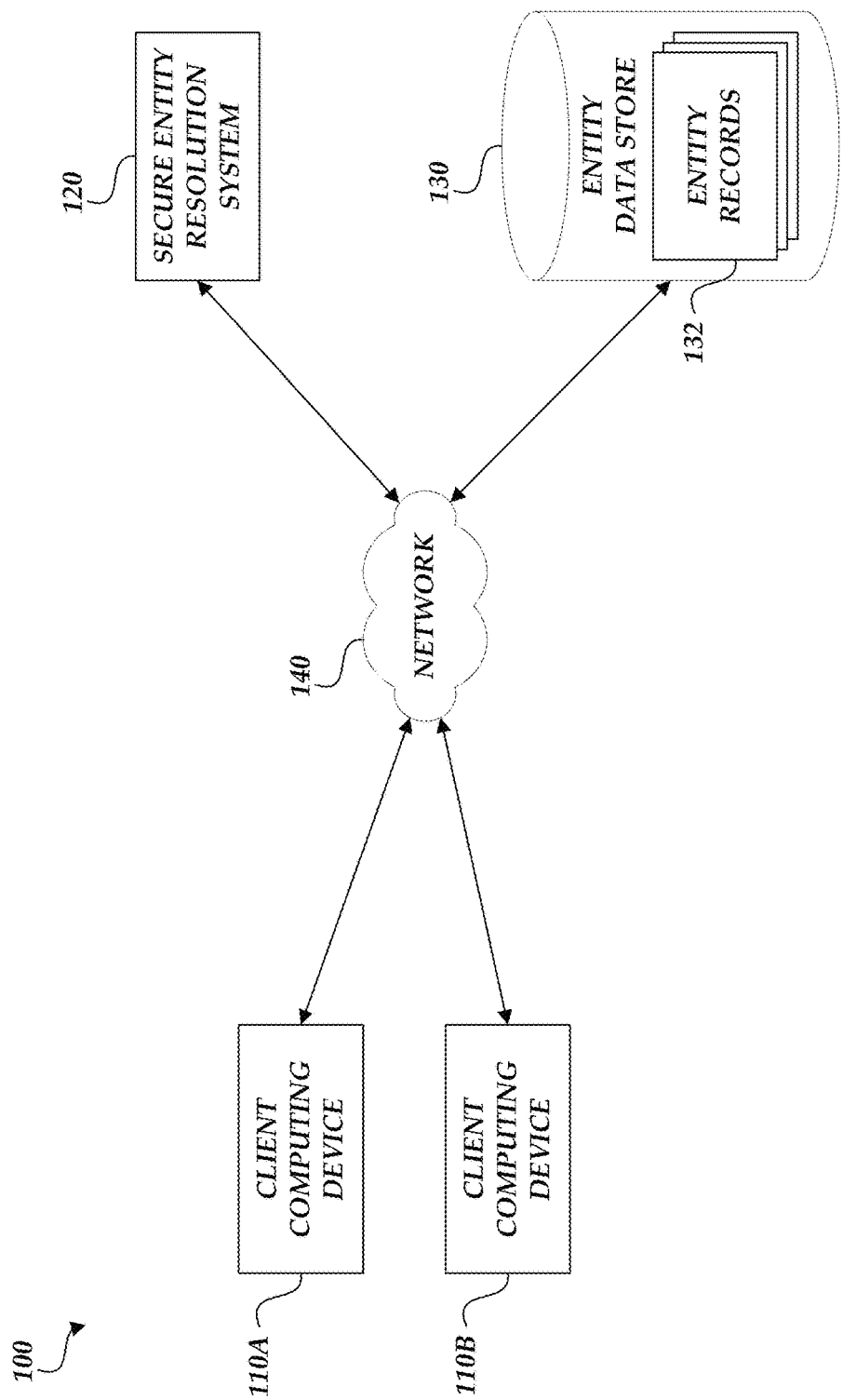
FIG. 1 is a block diagram of an example system for secure resolution of canonical entities, consistent with embodiments of the present disclosure.

Reference will now be made in detail to example embodiments, the examples of which are illustrated in the accompanying drawings. Whenever possible, the same reference numbers will be used throughout the drawings to refer to the same or like parts.

Embodiments of the present disclosure relate to systems, methods, and computer-readable mediums for securely resolving canonical entities. Data records may each refer to a respective entity, and some data records may each refer to a common entity. For example, two data records may contain information regarding the same person, place, object, or other entity. Individual data records, and individual fields within data records, may contain incomplete information, subsets of information, duplicate information, or conflicting information. A probability may be determined that two data records relate to a common entity by, for example, comparing the individual fields of one data record to corresponding fields in the other data record. Machine learning models, clustering of record pairs, or other techniques may be used to identify record pairs and determine probabilities that they relate to a common entity. Some examples of such techniques are disclosed in U.S. patent application Ser. No. 15/233,149, filed Aug. 10, 2016 and titled "SYSTEMS AND METHODS FOR AUTOMATIC CLUSTERING AND CANONICAL DESIGNATION OF RELATED DATA IN VARIOUS DATA STRUCTURES," the entirety of which is incorporated herein by reference.

Access to particular individual records, or in some embodiments to particular fields within one or more records, may be secured. For example, access to a particular record may be restricted to members of a particular team, or access to a particular field may be limited to individuals having certain permissions or access levels. Confirming that a particular pair of records relate to the same entity may thus be difficult or impossible to achieve due to the limited ability of users to access or view one or both records.

To overcome these problems, a secure entity resolution system may be implemented in accordance with aspects of the present disclosure. As described below in detail, a secure entity resolution system may facilitate identification, display, and reconciliation of records that relate to a common entity when only limited access to one or both records is permitted.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties. May also be referred to herein as "records."

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values. May also be referred to herein as "attributes" or "fields."

Property Type: The type of data a property is, such as a string, an integer, or a double. Property types may include complex property types, such as a series data values associated with timed ticks (e.g. a time series), etc. May also be referred to herein as "attribute types."

Property Value: The value associated with a property, which is of the type indicated in the property type associated with the property. A property may have multiple values. May also be referred to herein as "attribute values."

Example Embodiments

FIG. 1 is a block diagram of an example system 100 for secure resolution of canonical entities in accordance with aspects of the present disclosure. As shown, the example system 100 includes client computing devices 110A and 110B, a secure entity resolution system 120, and an entity data store 130, which may communicate with each other via a network 140.

Client computing devices 110A and 110B can be any computing devices that implement aspects of the present disclosure, and may include one or more software applications such as web browsers, mobile applications, messaging services, or other applications. In some embodiments, one or more client computing devices 110A-B may run on the secure entity resolution system 120. In any event, a user may interact with the example system 100 through one or more of the client computing devices 110A-B. While only two client computing devices 110A-B are shown in the example system 100, it will be understood that the present disclosure includes any number of client computing devices.

Figure 5:
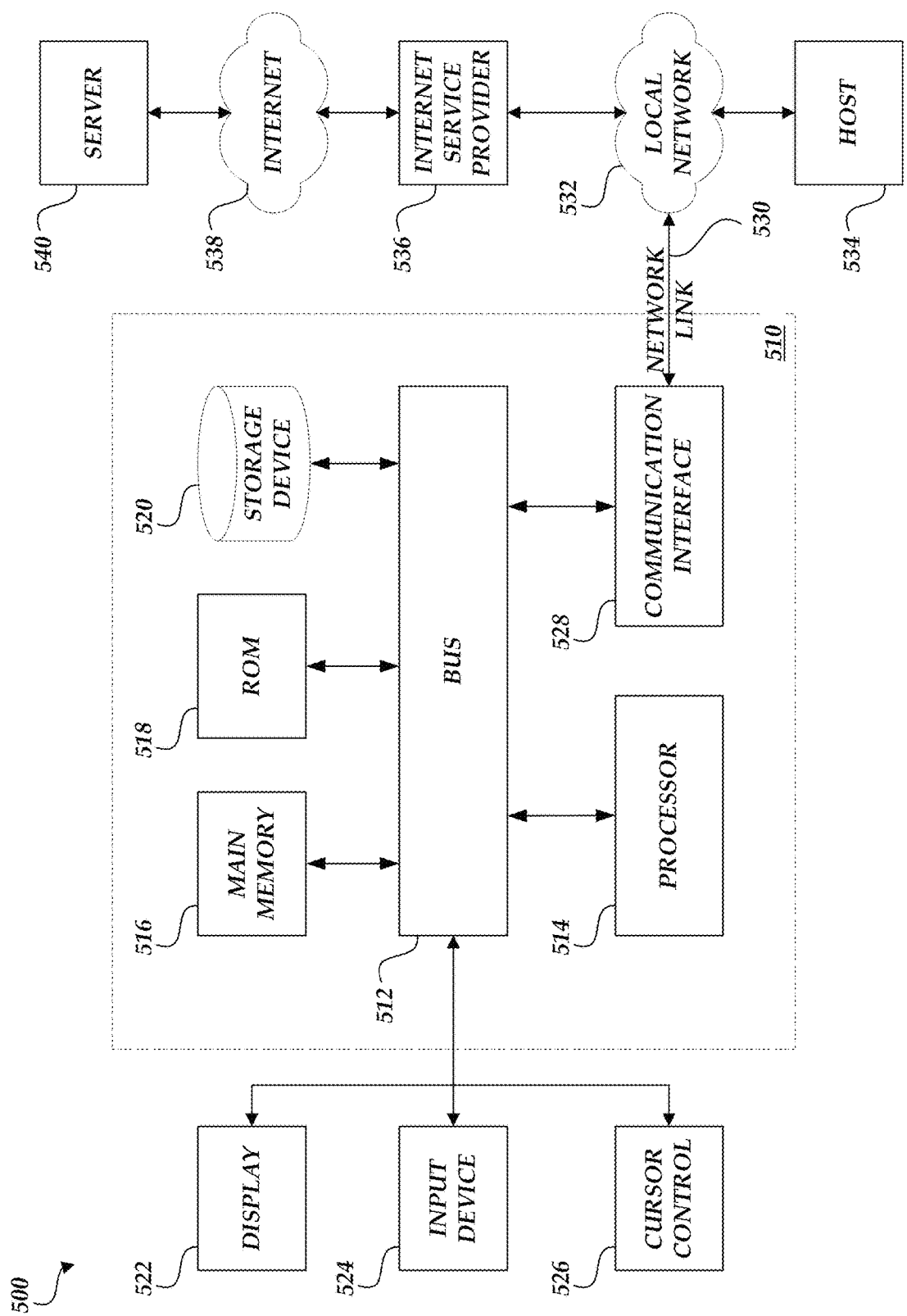
FIG. 5 is a block diagram of an example computing system for implementing embodiments of the present disclosure.

The secure entity resolution system 120 can be a computing system configured to identify records that may relate to a common entity and to display and reconcile these records in accordance with various access controls and security policies. For example, the secure entity resolution system 120 can be a computer system configured to execute software or a set of programmable instructions that process records to identify records that may relate to a common entity, determine whether one or more users are authorized to access all or part of one or both records, and display the records accordingly. In some embodiments, the secure entity resolution system 120 can be implemented using a computer system 510, as shown in FIG. 5 and described below.

The secure entity resolution system 120 can include one or more computing devices (e.g., server(s)), memory storing data and/or software instructions (e.g., database(s), memory device(s), etc.), and other known computing components. According to some embodiments, the secure entity resolution system 120 can include one or more networked computers that execute processing in parallel or use a distributed computing architecture. The secure entity resolution system 120 can be configured to communicate with one or more components of the system 100, and can be configured to securely provide entity resolution information via an interface(s) accessible by users over a network (e.g., the Internet). For example, the secure entity resolution system 120 can include a web server that hosts a web page accessible through network 140. In some embodiments, the secure entity resolution system 120 can include an application server configured to provide data to one or more client applications executing on computing systems connected to the secure entity resolution system 120 via the network 140.

The entity data store 130 may illustratively be any computer-readable data store that implements aspects of the present disclosure. For example, the entity data store 130 may be a magnetic medium such as a hard disc drive, a solid state device, a flash drive, one or more databases, one or more lists, or any other non-transient computer-readable data store. The entity data store 130 may store entity records 132, each of which may contain information relating to a particular entity. As described above and below, each entity record 132 may comprise one or more fields, which may contain values associated with the particular entity. In some embodiments, the entity data store 130 may further store information such as passwords, access control lists, or other information that relates to controlling or limiting access to particular entity records 132 or to particular fields within entity records 132. In further embodiments, as described above and below, the entity data store 130 may store information regarding probabilities that a first and second entity record 132 relate to the same entity, or information indicating whether a particular user or users has confirmed, denied, or commented on the possibility that two entity records 132 reference a common entity.

The example system 100 further includes a network 140, through which the client computing devices 110A-B, secure entity resolution system 120, and entity data store 130 may communicate. The network 140 may illustratively be any wired or wireless network, including but not limited to a local area network (LAN), wide area network (WAN), Wi-Fi network, Bluetooth network, cellular network, mesh network, the Internet, or other network or networks.

It will be understood that FIG. 1 is provided for purposes of example, and that the system 100 may include more, fewer, or different configurations of devices than the example illustrated in FIG. 1. For example, the entity data store 130 may be implemented as a component of the secure entity resolution system 120. As a further example, the secure entity resolution system 120 and the entity data store 130 may communicate via a different network than the network 140 used for communication between client computing devices 110A-B and the secure entity resolution system 120. Still further, a server or other device may serve as an intermediary between the client computing devices 110A-B and the secure entity resolution system 120. The present disclosure is thus understood to include many embodiments beyond the example provided in FIG. 1.

Figure 2A:
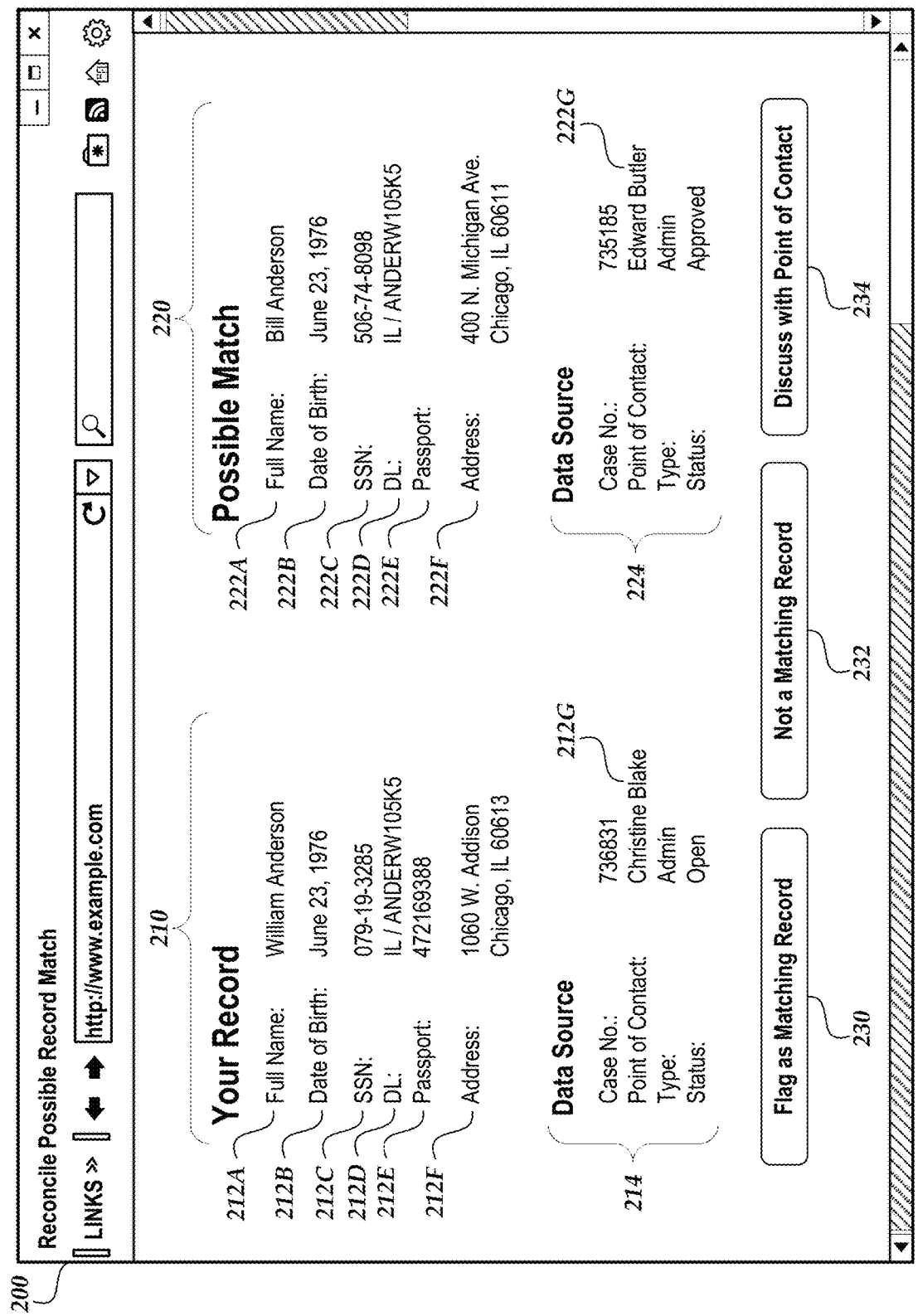
FIGS. 2A and 2B are diagrams of example user interfaces for securely displaying and resolving canonical entities, consistent with embodiments of the present disclosure.

FIG. 2A is a diagram of an example user interface 200 for securely displaying and resolving canonical entities in accordance with the present disclosure. In the illustrated example, the user interface 200 displays a first record 210, which is associated with an entity. The first record 210 includes fields 212A-F, each of which displays a particular attribute of the entity. As illustrated, the first record 210 relates to an individual, and the fields 212A-F contain information regarding the individual, such as the individual's name, date of birth, taxpayer identification number, and so forth.

The first record 210 further includes metadata 214, which comprises information about the first record 210 itself rather than information regarding the associated entity. The metadata 214 may include a point of contact 212G, which in various embodiments may be a user responsible for creating or maintaining the first record 210, a user identified as an owner or originator of the first record 210, a user associated with the underlying data contained in the first record 210, a database administrator, or another user or entity. The metadata 214 may further contain information such as an identification number of the first record 210, a type of the first record 210, a status of the first record 210, and so forth.

The user interface 200 further includes a second record 220, which may (or may not) be associated with the same entity as the first record 210. The second record 220 includes fields 222A-F, which may contain the same, similar, incomplete, or conflicting information as compared to the corresponding fields 212A-F of the first record 210. For example, the name field 222A of the second record 220 contains similar but not identical information to the name field 212A of the first record. As a further example, the TIN field 222D contains conflicting information relative to the TIN field 212D. As described below, a secure entity resolution system, such as the secure entity resolution system 120 of FIG. 1, may compare and analyze the fields 212A-F and 222A-F to determine a likelihood that the two records relate to a common entity. The second record 220 further includes metadata 224, which in turn includes a point of contact 222G for the second record 220.

The user interface 200 further includes user interface controls 230, 232, and 234, which may be used to indicate whether or not the records match, or to communicate with a point of contact. The match confirmation control 230, for example, may be used to indicate that the user believes the first record 210 and the second record 220 relate to the same entity. The match rejection control 232 may similarly be used to indicate that the user believes the first record 210 and the second record 220 do not both relate to the same entity. And, as discussed in further detail below, the message control 234 may be used to facilitate communications with the point of contact 222G regarding the possibility that the records relate to the same entity.

It will be understood that the user interface 200 is provided for purposes of example, and that user interfaces displaying more, less, or different information are within the scope of the present disclosure. In some embodiments, the user interface 200 may include an estimated probability that both records relate to a common entity, or may highlight similarities and differences between the records. For example, the user interface 200 may use colors, fonts, or other indications to highlight fields that contain matching information, similar information, or conflicting information. As a further example, the user interface 200 may include uniform resource identifiers (URI) or other links to additional information, such as a link to information regarding the point of contact 222G.

Figure 2B:
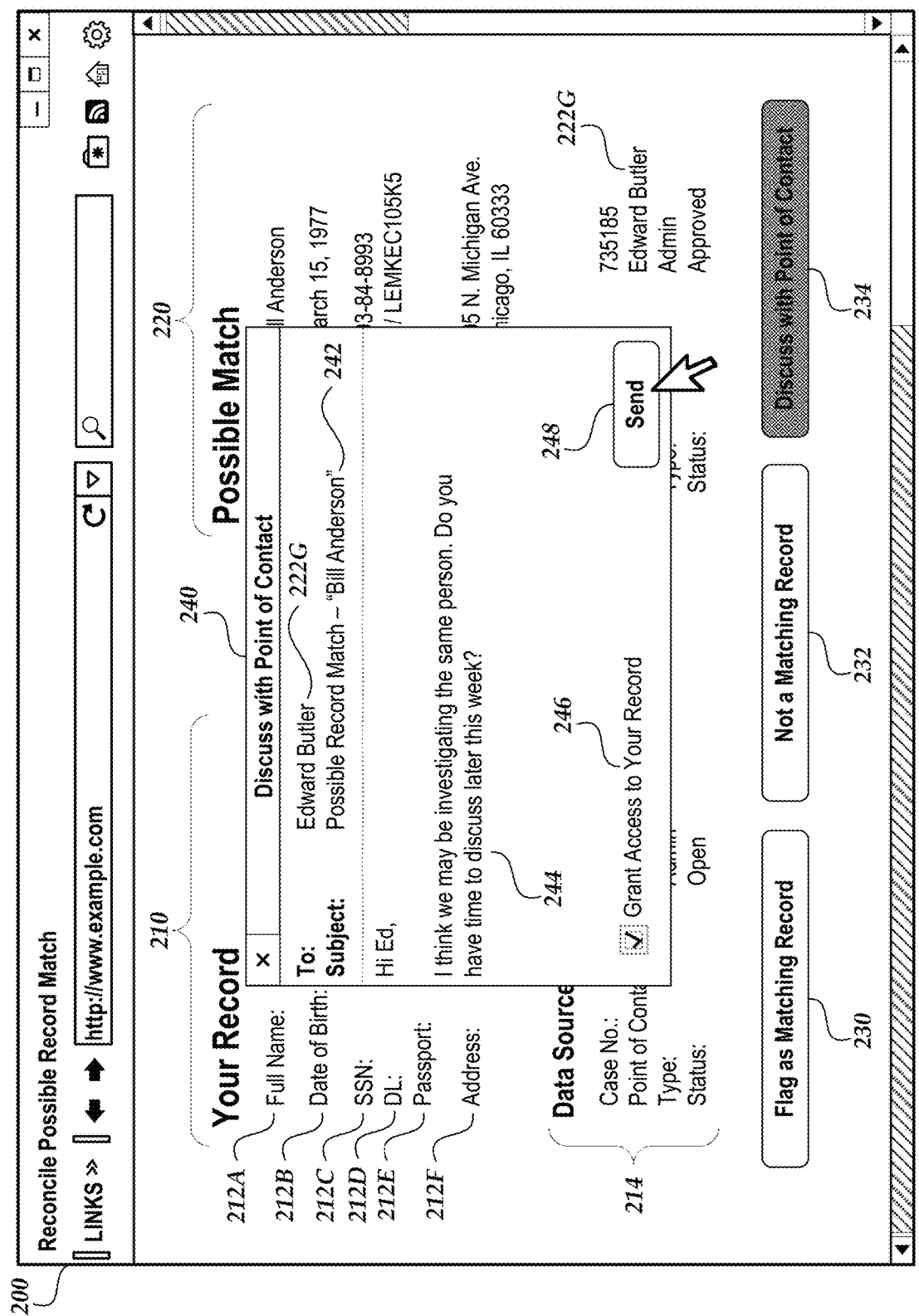

FIG. 2B is a diagram of an example message dialog 240 that may be displayed in some embodiments when the message control 234 is selected. The message dialog 240 may facilitate communication with the point of contact 222G associated with the second record 210. In some embodiments, the message dialog 240 may include a message subject 242, which may be automatically generated based on information contained in the first record 210, the second record 220, or both. The message dialog 240 may further include a message content area 244, which may receive user input regarding the possibility that the records relate to the same entity.

In some embodiments, the message dialog 240 may further include an access control 246, which may enable granting permission to the point of contact 222G to access the first record 210. The access control 246 may optionally be displayed, for example, based on whether the user of the user interface 200 has permission to grant the point of contact 222G access to all or part of the first record 210. In some embodiments, multiple access controls may be provided to enable granting of access to various portions of the first record 210 or to individual fields 212A-F of the first record 210. The message dialog 240 may further include a send control 248, which may enable sending the message to the point of contact 222G. In various embodiments, invoking the send control 248 may trigger sending an email message, a text message, a notification, a log entry, or other communication with the point of contact 222G.

In various embodiments, the message dialog 240 may further include all or part of the first record 210, a link to all or part of the first record 210, corresponding information from the second record 220, a link to the second record 220, a link to the user interface 200, or a link to a corresponding user interface that displays a subset of the first record 210. The content of the message dialog 240 may, in some embodiments, be determined according to whether the point of contact 222G has permission to access all or part of the first record 210, and/or whether the user of the user interface 200 is authorized to grant access to all or part of the first record 210 to the point of contact 222G. In further embodiments, the message dialog 240 may indicate that the point of contact 222G is not authorized to view the first record or even to be informed of the existence of the first record, and the access control 246 and/or the send control 248 may thus be omitted.

Figure 3:
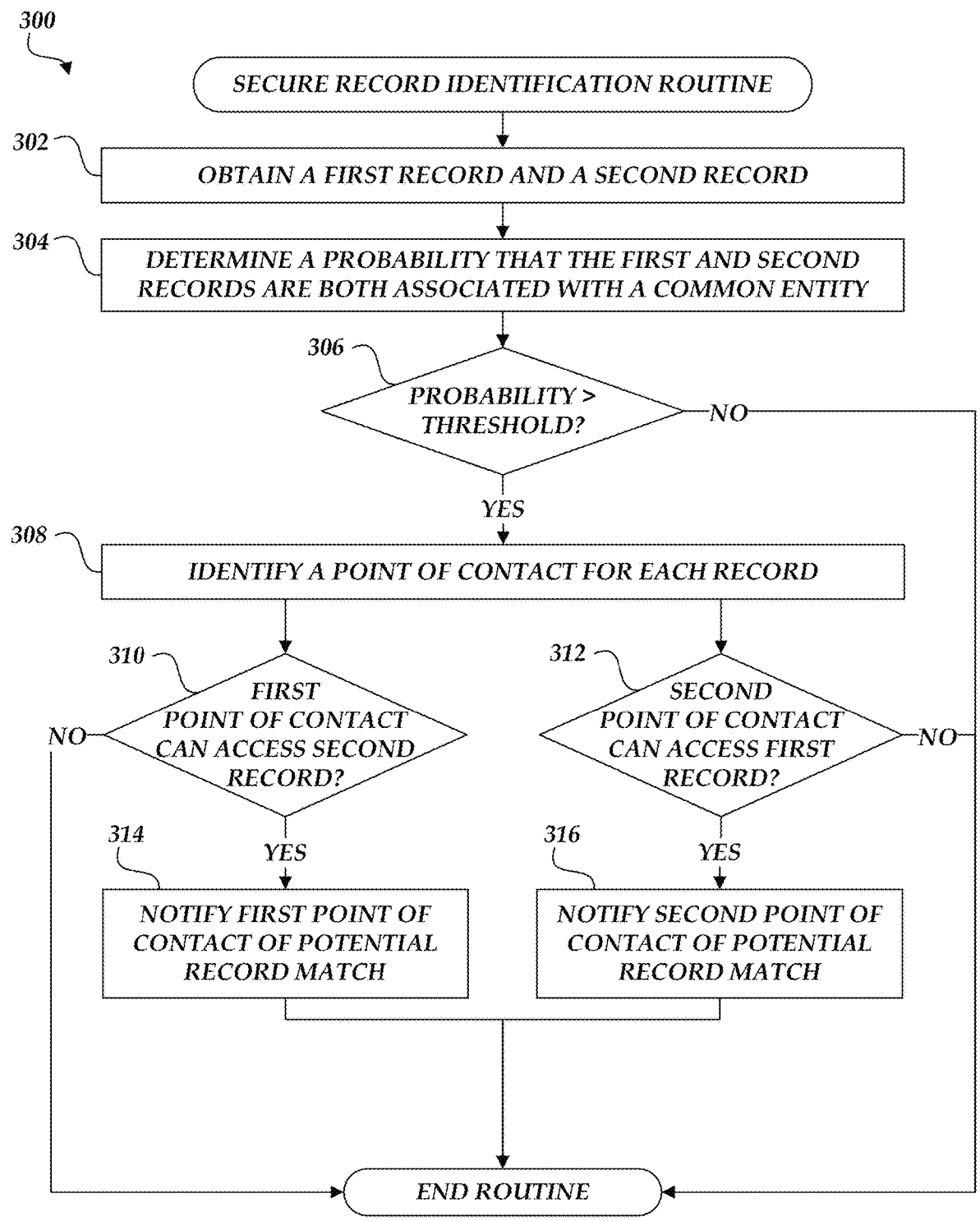
FIG. 3 is a flowchart representing an example method for identifying and securely presenting records that may relate to a common entity, consistent with aspects of the present disclosure.

FIG. 3 is a flowchart representing an example 300 for identifying records that may relate to a common entity and securely providing information regarding these records, consistent with embodiments of the present disclosure. while the flowchart discloses the following steps in a particular order, it will be appreciated that at least some of the steps can be moved, modified, or deleted where appropriate, consistent with the teachings of the present disclosure. The secure record identification routine 300 may be carried out in full or in part by a secure entity resolution system, such as the secure entity resolution system 120 of FIG. 1. It will also be appreciated that some of these steps can be performed in full or in part by other devices, such as the client computing devices 110A and 110B described above with reference to FIG. 1.

At block 302, a first record and a second record may be obtained. The first record and the second record may illustratively be obtained from a data store, such as the entity data store 130 of FIG. 1. As described above, the first record and the second record may each be associated with an entity, and may each contain one or more fields that contain information regarding the particular entity.

At block 304, a probability may be determined that indicates the likelihood that the first record and the second record are both associated with a common entity. As described above, in some embodiments, the probability may be determined using a machine learning model that compares one or more fields of the first record to a corresponding field or fields of the second record. In further embodiments, records that may be associated with a common entity may be identified using criteria such as particular fields (e.g., a name or an address) being similar or identical.

In some embodiments, a machine learning model may be used to process a collection of records that may number in the thousands or millions, and may identify from the collection of records a corpus of potentially matching record pairs and their associated probabilities. In such embodiments, blocks 302 and 304 may be omitted, and the routine 300 may instead iterate through the corpus of potentially matching record pairs.

At decision block 306, a determination may be made as to whether the probability determined at block 304 satisfies a criterion. For example, a determination may be made as to whether the probability exceeds a threshold of, e.g., 50% (that is, that the records are more likely than not to be associated with a common entity). As further examples, a determination may be made as to whether the probability exceeds 60%, exceeds 70%, or satisfies any other criterion. If the probability does not satisfy the criterion, then the routine 300 ends.

If the probability does satisfy the criterion, then at block 308 a first point of contact is identified for the first record, and a second point of contact is identified for the second record. In some embodiments, a point of contact is identified for only one of the records. In various other embodiments, as described above, the point of contact for a record may be a user responsible for creating the record, responsible for maintaining the record, or may be otherwise associated with the record. For example, the identified point of contact for a first record may be a user of a secure entity resolution system who has permission to access the first record. It will be understood that the point of contact identified for a record is not necessary the only point of contact or the main point of contact for the record, and that the ways in which a point of contact may be associated with the record are not limited to being specifically included in record metadata or other record content.

At decision block 310, a determination may be made as to whether the first point of contact can access some or all of the second record. Illustratively, access to the second record (or to individual fields of the second record) may be restricted to users on a particular list, such as an access control list, or may be limited to users having particular characteristics, permissions, settings, or relationships to the second record. If the first point of contact can access all or part of the second record, then at block 314 a notification may be generated and sent to the first point of contact.

At decision block 312, a determination may be made as to whether the second point of contact can access some or all of the first record. As with the second record, access to the first record (or to individual fields of the first records) may illustratively be restricted to users on a particular list, such as an access control list, or may be limited to users having particular characteristics, permissions, settings, or relationships to the first record. If the second point of contact can access all or part of the first record, then at block 316 a notification may be generated and sent to the second point of contact.

In various embodiments, the interactions at decision blocks 310 and 312 may be carried out in parallel or sequentially in either order. In further embodiments, user interfaces (such as the user interface 200 of FIGS. 2A-B) may be generated and displayed to the first point of contact and/or the second point of contact in addition to or in place of generating and sending notifications, as described in more detail below.

In some embodiments, the routine 300 may be carried out periodically or on an as-needed basis. For example, the routine 300 may be carried out nightly, weekly, when new records are created, or when records are updated. As a further example, the routine 300 may be carried out with regard to one or more records of a particular user when that user logs into a computing system or obtains the one or more records from a data store.

It will be understood that the example routine 300 represents a specific technical improvement to a computer-related technology, and may provide a set of rules that allows a computing device to efficiently perform tasks that it would otherwise be unable to perform. For example, one or more aspects of routine 300 may allow a computing device to identify and securely notify users of records that may contain conflicting or redundant information. Carrying out the routine 300 may thus improve the performance of the computing device by making it possible for these redundancies to be eliminated, thereby freeing up the computing resources associated with redundant information. Carrying out the routine 300 may further improve the accuracy of the data stored by the computing device, which thereby improves its performance with regard to providing relevant and accurate information.

Figure 4:
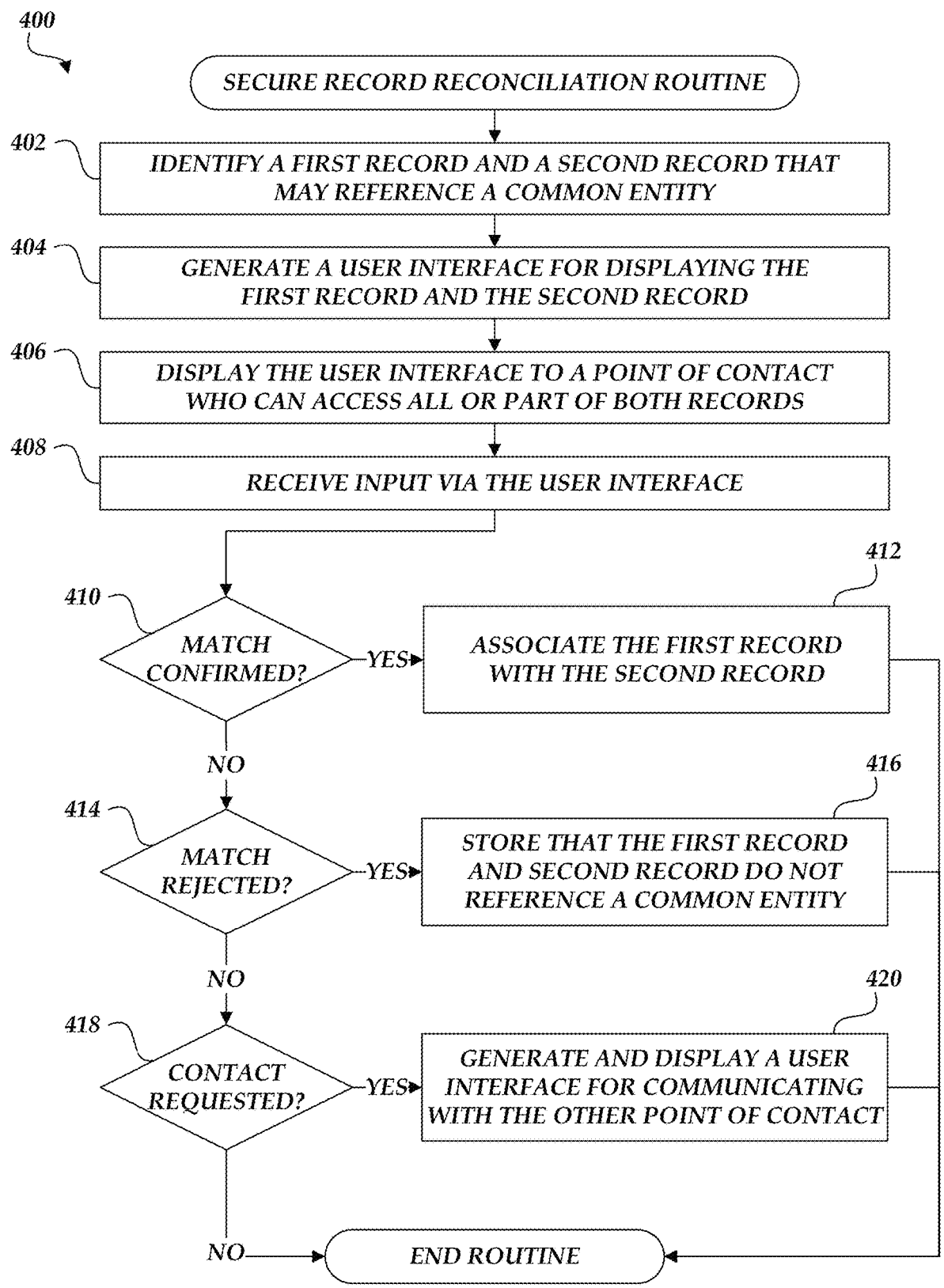
FIG. 4 is a flowchart representing an example method for securely reconciling records that may relate to a common entity, consistent with aspects of the present disclosure.

FIG. 4 is a flowchart representing an example routine 400 for securely reconciling records that may relate to a common entity, consistent with embodiments of the present disclosure. while the flowchart discloses the following steps in a particular order, it will be appreciated that at least some of the steps can be moved, modified, or deleted where appropriate, consistent with the teachings of the present disclosure. The secure record reconciliation routine 400 may be carried out in full or in part by a secure entity resolution system, such as the secure entity resolution system 120 of FIG. 1. It will also be appreciated that some of these steps can be performed in full or in part by other devices, such as the client computing devices 110A and 110B described above with reference to FIG. 1.

At block 402, a first record and a second record that may relate to a common entity may be identified. Illustratively, the first record and the second record may be identified by carrying out a routine, such as the routine 300 described above with reference to FIG. 3. At block 404, a user interface may be generated that displays the first and second record. In some embodiments, the user interface may further include information regarding the probability that the records relate to the same entity, or information indicating the basis for determining that probability (e.g., matching or similar values for one or more fields in the records).

At block 406, the user interface may be displayed to a point of contact who has permission to access both records. The point of contact may be determined, for example, by carrying out routine 300. In some embodiments, the point of contact may only have permission to access a portion of one of the records, and the user interface generated at block 404 may display only that portion of the record. For example, the point of contact may only have permission to view the metadata of a second record, and thus may only be provided with information regarding the second record's point of contact.

At 408, input may be received via the user interface. At decision block 410 the input may be processed and a determination may be made as to whether the input represents confirmation that the first record and the second record relate to the same entity. If so, then at block 412 the first record may be associated with the second record. Illustratively, the first record may be associated with the second record by storing the association in a data store, by merging the records (which in some embodiments may include reconciling incomplete or conflicting data fields), or by logging that the point of contact believes the records relate to the same entity. It will be understood that a confirming input received from a point of contact may not be dispositive, and that a point of contact may incorrectly confirm the records relate to the same entity when in fact they do not. In some embodiments, the routine 400 may require confirmation from two or more points of contact, or from at least one point of contact for each record, before associating the first record with the second record. In further embodiments, multiple executions of the routine 400 may store that various users disagree over whether the first record and the second record relate to the same entity, or may store that a particular user or users have changed their previous opinion.

At decision block 414, a determination may be made as to whether the input indicates that the first record and the second record do not both relate to a common entity. If so, then at block 416 the non-confirmation may be associated with either record, with both records, or with the point of contact from which the input was received, and the non-confirmation may then be stored in a data store. Illustratively, the non-confirmation may be used to prevent the first record and the second record from being re-identified to the point of contact as potentially relating to the same entity. In some embodiments, the secure record identification routine 300 may verify whether a point of contact has already indicated that a pair of records do not both relate to a common entity, and if so may determine not to notify the first point of contact that the routine has again identified them as potentially referencing a common entity. In further embodiments, the routine 300 may require that the probability exceed a higher threshold before re-presenting the same pair to a point of contact, or may automatically reduce the probability given that a point of contact has previously rejected the possibility.

At decision block 418, a determination may be made as to whether a point of contact for one record has requested communication with a point of contact for the other record. If so, then at block 420 a user interface may be generated and displayed to facilitate communication between the points of contact. In various embodiments, the routine 400 may obtain a point of contact for the second record using metadata from the second record, access control lists or other security measures associated with the second record, a default point of contact, or other information. In some embodiments, as described above, the user interface may include controls that enable granting permission to access to all or part of a record.

It will be understood that the interactions at decision blocks 410, 414, and 418 may be carried out in any order, or in parallel. In some embodiments, if the input received via the user interface does not correspond to any of the decision blocks 410, 414, and 418, the routine 400 may branch to block 408 and await further input. The blocks of the routine 400 may further be rearranged, combined, or separated in various embodiments beyond the example embodiment depicted in FIG. 4, which is thus understood to be illustrative and not limiting.

It will further be understood that the example routine 400 represents a specific technical improvement to a computer-related technology, and provides a set of rules that may allow a computing device to efficiently perform tasks that it would otherwise be unable to perform. For example, one or more aspects of routine 400 may allow a computing device to securely reconcile and/or remove records that may contain conflicting or redundant information. Carrying out the routine 400 may thus improve the performance of the computing device by making it possible for these redundancies to be eliminated, thereby freeing up the computing resources associated with redundant information without compromising the security of the information. Carrying out the routine 400 may further improve the accuracy of the data stored by the computing device, which thereby improves its performance with regard to securely providing relevant and accurate information.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 5 is a block diagram that illustrates a computer system 510 upon which various embodiments may be implemented. Computer system 510 includes a bus 512 or other communication mechanism for communicating information, and a hardware processor 514, or multiple processors 514, coupled with bus 512 for processing information. Hardware processor(s) 514 may be, for example, one or more general purpose microprocessors.

Computer system 510 also includes a main memory 516, such as a random access memory (RAM), cache and/or other dynamic storage devices, coupled to bus 512 for storing information and instructions to be executed by processor 514. Main memory 516 also may be used for storing temporary variables or other intermediate information during execution of instructions to be executed by processor 514. Such instructions, when stored in storage media accessible to processor 514, render computer system 510 into a special-purpose machine that is customized to perform the operations specified in the instructions.

Computer system 510 further includes a read only memory (ROM) 518 or other static storage device coupled to bus 512 for storing static information and instructions for processor 514. A storage device 520, such as a magnetic disk, optical disk, or USB thumb drive (Flash drive), etc., is provided and coupled to bus 512 for storing information and instructions.

Computer system 510 may be coupled via bus 512 to a display 522, such as a cathode ray tube (CRT) or LCD display (or touch screen), for displaying information to a computer user. An input device 524, including alphanumeric and other keys, is coupled to bus 512 for communicating information and command selections to processor 514. Another type of user input device is cursor control 526, such as a mouse, a trackball, or cursor direction keys for communicating direction information and command selections to processor 514 and for controlling cursor movement on display 522. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 510 may include a user interface module to implement a GUI that may be stored in a mass storage device as computer executable program instructions that are executed by the computing device(s). Computer system 510 may further, as described below, implement the techniques described herein using customized hard-wired logic, one or more ASICs or FPGAs, firmware and/or program logic which in combination with the computer system causes or programs computer system 510 to be a special-purpose machine. According to one embodiment, the techniques herein are performed by computer system 510 in response to processor(s) 514 executing one or more sequences of one or more computer readable program instructions contained in main memory 516. Such instructions may be read into main memory 516 from another storage medium, such as storage device 520. Execution of the sequences of instructions contained in main memory 516 causes processor(s) 514 to perform the process steps described herein. In alternative embodiments, hard-wired circuitry may be used in place of or in combination with software instructions.

Various forms of computer readable storage media may be involved in carrying one or more sequences of one or more computer readable program instructions to processor 514 for execution. For example, the instructions may initially be carried on a magnetic disk or solid state drive of a remote computer. The remote computer can load the instructions into its dynamic memory and send the instructions over a telephone line using a modem. A modem local to computer system 510 can receive the data on the telephone line and use an infra-red transmitter to convert the data to an infra-red signal. An infra-red detector can receive the data carried in the infra-red signal and appropriate circuitry can place the data on bus 512. Bus 512 carries the data to main memory 516, from which processor 514 retrieves and executes the instructions. The instructions received by main memory 516 may optionally be stored on storage device 810 either before or after execution by processor 514.

Computer system 510 also includes a communication interface 528 coupled to bus 512. Communication interface 528 provides a two-way data communication coupling to a network link 530 that is connected to a local network 532. For example, communication interface 528 may be an integrated services digital network (ISDN) card, cable modem, satellite modem, or a modem to provide a data communication connection to a corresponding type of telephone line. As another example, communication interface 528 may be a local area network (LAN) card to provide a data communication connection to a compatible LAN (or WAN component to communicated with a WAN). Wireless links may also be implemented. In any such implementation, communication interface 528 sends and receives electrical, electromagnetic or optical signals that carry digital data streams representing various types of information.

Network link 530 typically provides data communication through one or more networks to other data devices. For example, network link 530 may provide a connection through local network 532 to a host computer 534 or to data equipment operated by an Internet Service Provider (ISP) 536. ISP 536 in turn provides data communication services through the world wide packet data communication network now commonly referred to as the "Internet" 538. Local network 532 and Internet 538 both use electrical, electromagnetic or optical signals that carry digital data streams. The signals through the various networks and the signals on network link 530 and through communication interface 528, which carry the digital data to and from computer system 510, are example forms of transmission media.

Computer system 510 can send messages and receive data, including program code, through the network(s), network link 530 and communication interface 528. In the Internet example, a server 540 might transmit a requested code for an application program through Internet 538, ISP 536, local network 532 and communication interface 528.

The received code may be executed by processor 514 as it is received, and/or stored in storage device 520 or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method performed using one or more processors executing specific computer executable instructions, the computer-implemented method comprising:
    applying a machine learning model to determine, based at least in part on individual fields of a first record and a second record, a probability that the first record and the second record both comprise information regarding a common entity;
    in response to determining that the probability exceeds a threshold, identifying a first user associated with the first record;
    determining that the first user has permission to access both the first record and the second record;
    generating a first user interface for displaying the first record, the second record, the probability that the first record and the second record both comprise information regarding the common entity, and at least one user interface control that enables communication with a second user associated with the second record, wherein the second user has permission to access the second record, and wherein the second user does not have permission to access at least a portion of the first record;
    without displaying the first record to the second user, displaying the first user interface on a first computing device associated with the first user;
    receiving, from the first computing device, a request to grant permission to access the first record to the second user; and
    in response to the request, displaying the first user interface on a second computing device associated with the second user.

2. The computer-implemented method of claim 1 further comprising determining that the second user does not have permission to access at least a portion of the first record.

3. The computer-implemented method of claim 1, wherein the machine learning model is applied in response to one or more of the first user creating the first record, the second user creating the second record, the first user obtaining the first record from a data store, or the second user obtaining the second record from the data store.

4. The computer-implemented method of claim 1, wherein the machine learning model is applied to pairs of records in a plurality of records on a periodic basis.

5. The computer-implemented method of claim 1 further comprising:
    receiving, from the first computing device, a request to communicate with the second user, the request including information regarding one or more of the first record and the second record; and
    transmitting the information to the second user.

6. A system comprising:
    a data store configured to store computer-executable instructions; and
    a processor in communication with the data store, wherein the computer-executable instructions, when executed by the processor, configure the processor to perform operations including:
        applying a machine learning model to determine, based at least in part on individual fields of a first record and a second record, a probability that the first record and the second record both comprise information regarding a common entity;
        in response to determining that the probability satisfies a criterion, identifying a first user associated with the first record, wherein the first user has permission to access both the first record and the second record;
        generating a first user interface for displaying the first record, the second record, the probability that the first record and the second record both comprise information regarding the common entity, and at least one user interface control that enables communication with a second user associated with the second record, wherein the second user has permission to access the second record, and wherein the second user does not have permission to access at least a portion of the first record;
        without causing display of the first record to the second user, causing display of the first user interface on a first computing device associated with the first user;
        receiving, from the first computing device, a request to grant permission to access the first record to the second user; and
        in response to the request, displaying the first record on a second computing device associated with the second user.

7. The system of claim 6, wherein displaying the first record on the second computing device comprises displaying the first user interface on the second computing device.

8. The system of claim 6, wherein the operations further include identifying the second record based at least in part on the first record.

9. The system of claim 6, wherein the operations further include:

applying the machine learning model to determine a second probability that the first record and a third record both comprise information regarding the common entity; and in response to determining that the second probability satisfies the criterion, generating a second user interface for displaying the first record, the third record, the second probability, and at least one user interface control that enables communication with a third user associated with the third record, wherein the third user has permission to access the third record, and wherein the third user does not have permission to access at least a portion of the first record.

10. The system of claim 9, wherein the operations further include:

without displaying the first record to the third user, displaying the second user interface on the first computing device associated with the first user; and receiving, from the first computing device, an indication that the first record and the third record do not both comprise information regarding the common entity.

11. The system of claim 10, wherein the operations further include storing the indication that the first record and the third record do not both comprise information regarding the common entity.

12. The system of claim 6, wherein the criterion comprises a threshold.

13. The system of claim 12, wherein the operations further include determining the threshold.

14. The system of claim 13, wherein the threshold is determined based at least in part on a previously received indication that the first record and the second record do not both comprise information regarding the common entity.

15. The system of claim 6, wherein the operations further include determining that the first user has permission to access the first record and the second record.

16. The system of claim 6, wherein identifying the first user associated with the first record comprises identifying a user who has permission to access both the first record and the second record.

17. A non-transitory computer-readable storage medium including computer-executable instructions that, when executed by a processor, cause the processor to perform operations including:

applying a machine learning model to determine a probability that a first record and a second record both comprise information regarding a common entity;

in response to determining that the probability satisfies a criterion, identifying a first user who has permission to access both the first record and the second record;

generating a first user interface for displaying one or more attributes of the first record, a corresponding one or more attributes of the second record, an indication that the probability satisfies the criterion, and at least one user interface control that enables communication with a second user who has permission to access the second record, wherein the second user does not have permission to access at least a portion of the first record;

without causing display of the first record to the second user, causing display of the first user interface on a first computing device associated with the first user;

receiving, from the first computing device, a request to grant permission to access the first record to the second user; and in response to the request, displaying the first record on a second computing device associated with the second user.

18. The non-transitory computer-readable storage medium of claim 17, wherein the probability is determined based at least in part on the one or more attributes of the first record and the corresponding one or more attributes of the second record.

19. The non-transitory computer-readable storage medium of claim 17, wherein at least one of the one or more attributes of the first record differs from a corresponding attribute of the second record.

20. The non-transitory computer-readable storage medium of claim 17, wherein the operations further include associating the first record with the second record.

* * * * *